US012718992B2

(12) United States Patent
Tannhäuser

(10) Patent No.: US 12,718,992 B2
(45) Date of Patent: Aug. 25, 2026

(54) PROTECTIVE SWITCHING DEVICE AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 18/258,603

(22) PCT Filed: Dec. 21, 2021

(86) PCT No.: PCT/EP2021/087063
§ 371 (c)(1),
(2) Date: Jun. 21, 2023

(87) PCT Pub. No.: WO2022/136414
PCT Pub. Date: Jun. 30, 2022

(65) Prior Publication Data

US 2024/0055197 A1 Feb. 15, 2024

(30) Foreign Application Priority Data

Dec. 21, 2020 (DE) ..................... 10 2020 216 416.9
Dec. 20, 2021 (EP) .................................... 21216137

(51) Int. Cl.
*H02H 3/08* (2006.01)
*H01H 9/54* (2006.01)
(Continued)

(52) U.S. Cl.
CPC ............ *H01H 9/547* (2013.01); *H01H 9/548* (2013.01); *H01H 71/125* (2013.01); *H02H 3/05* (2013.01); *H02H 3/08* (2013.01)

(58) Field of Classification Search
CPC ...... H01H 9/547; H01H 9/548; H01H 71/125; H02H 3/08; H02H 3/05
(Continued)

(56) References Cited

U.S. PATENT DOCUMENTS 3,611,043 A 10/1971 Steen
5,796,636 A * 8/1998 Andrews ................ H02H 3/335 702/158
(Continued)

FOREIGN PATENT DOCUMENTS

DE 102007006564 A1 8/2008
DE 202009014759 U1 3/2010
(Continued)

*Primary Examiner* — Crystal L Hammond
*Assistant Examiner* — Lucy M Thomas
(74) *Attorney, Agent, or Firm* — Laurence A. Greenberg; Werner H. Stemer; Ralph E. Locher

(57) ABSTRACT

A method for protecting an electrical low-voltage circuit for a protective switching device. A mechanical break contact unit, which is switched by opening or closing contacts for current flow in the low-voltage circuit, and an electronic interrupter, which is switched by semiconductor-based switching elements into a high-impedance state or a low-impedance state of the switching elements, are connected in series. If the level of current in the low-voltage circuit exceeds a current threshold value, prevention of current flow through the low-voltage circuit is initiated by high-impedance switching of the electronic interrupter. When the electronic interrupter is high impedance or switched to high impedance, the level of current in the low-voltage circuit continues to be determined, and if a first residual current threshold value is exceeded, the contacts of the mechanical break contact unit are opened.

24 Claims, 4 Drawing Sheets

(51) Int. Cl.

| | |
|---|---|
| ***H01H 71/12*** | (2006.01) |
| ***H02H 3/05*** | (2006.01) |
| ***H02H 9/02*** | (2006.01) |

(58) Field of Classification Search

USPC ........................................................ 361/93.1

See application file for complete search history.

(56) References Cited

U.S. PATENT DOCUMENTS

| | | | | |
|---|---|---|---|---|
| 9,767,969 | B2 * | 9/2017 | Boe | G01R 27/18 |
| 2011/0058296 | A1 * | 3/2011 | Orchowski | H05B 39/044 361/88 |
| 2011/0222200 | A1 * | 9/2011 | Fuller | H01H 9/548 361/100 |
| 2012/0146655 | A1 | 6/2012 | Suchoff | |
| 2015/0349671 | A1 * | 12/2015 | Kuhla | H01H 9/542 318/400.26 |
| 2019/0103742 | A1 | 4/2019 | Kennedy et al. | |
| 2019/0371557 | A1 | 12/2019 | Haslinger | |
| 2020/0366078 | A1 | 11/2020 | Telefus et al. | |
| 2021/0296059 | A1 * | 9/2021 | Hussmann | H01H 9/02 |
| 2022/0337046 | A1 | 10/2022 | Erven | |
| 2024/0047961 | A1 | 2/2024 | Döbler et al. | |

FOREIGN PATENT DOCUMENTS

| | | | |
|---|---|---|---|
| DE | 102016123955 | A1 | 6/2018 |
| DE | 102019213604 | A1 | 3/2021 |
| DE | 102020216416 | A1 | 6/2022 |
| WO | WO 2012038237 | A1 | 3/2012 |

* cited by examiner

Frist: __.__.22 Termin: 08.03.2022 (WIN)

SEDE
SWE
NSE
φ(t)
U
UE
DU
DI
SEAE
SWI
CE
TRIP

PROTECTIVE SWITCHING DEVICE AND METHOD

FIELD AND BACKGROUND OF THE INVENTION

The invention relates to the technical field of a protective switching device for a low-voltage circuit having an electronic interruption unit and to a method for a protective switching device for a low-voltage circuit having an electronic interruption unit.

Low voltage is used to mean voltages of up to 1000 volts AC or up to 1500 volts DC. Low voltage is used to mean, in particular, voltages which are greater than extra-low voltage, with values of 50 volts AC or 120 volts DC.

A low-voltage circuit or grid or installation is used to mean circuits with nominal currents or rated currents of up to 125 amperes, more specifically up to 63 amperes. A low-voltage circuit is used to mean, in particular, circuits with nominal currents or rated currents of up to 50 amperes, 40 amperes, 32 amperes, 25 amperes, 16 amperes or 10 amperes. Said current values are used to mean, in particular, nominal, rated or/and shutdown currents, that is to say the maximum current which is normally carried through the circuit or in the case of which the electrical circuit is usually interrupted, for example by means of a protective device, such as a protective switching device, a circuit breaker or a power switch.

Circuit breakers are overcurrent protective devices which have been known for a long time and are used in electrical installation technology in low-voltage circuits. They protect lines from damage caused by heating as a result of an excessively high current and/or a short circuit. A circuit breaker can automatically shut down the circuit in the event of an overload and/or a short circuit. A circuit breaker is a fuse element which does not automatically reset.

In contrast to circuit breakers, power switches are intended for currents of greater than 125 A, sometimes even already starting from 63 amperes. Circuit breakers therefore have a simpler and more delicate design. Circuit breakers usually have a fastening option for fastening to a so-called top-hat rail (carrier rail, DIN rail, TH35).

Circuit breakers have an electromechanical design. In a housing, they have a mechanical switching contact or shunt opening release for interrupting (tripping) the electrical current. A bimetallic protective element or bimetallic element is usually used for tripping (interruption) in the event of a sustained overcurrent (overcurrent protection) or in the event of a thermal overload (overload protection). An electromagnetic release having a coil is used for short-term tripping if an overcurrent limit value is exceeded or in the event of a short circuit (short circuit protection). One or more arc quenching chambers or arc quenching devices are provided. Connection elements for conductors of the electrical circuit to be protected are also provided.

Protective switching devices having an electronic interruption unit are relatively new developments. They have a semi-conductor-based electronic interruption unit. That is to say, the electrical current flow in the low-voltage circuit is guided via semiconductor components or semiconductor switches which can interrupt the electrical current flow or can be switched to be conductive. Protective switching devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current in the low-voltage circuit to be protected is guided both via the mechanical isolating contact system and via the electronic interruption unit.

In the case of semiconductor-based protective switching devices or protective devices, or solid state circuit breakers, SSCB for short, the switching energy need not be converted into an arc, as in the case of a mechanical switching device, but rather must be converted into heat by means of an additional circuit, the energy absorber. In this case, the shutdown energy comprises the energy stored in the circuit, that is to say in the grid, line or load impedances (consumer impedances). In order to relieve the load on the energy absorber, the current flowing at the time of shutdown must be as low as possible. This also applies in the case of a short circuit. The current rises very quickly in this case. Quickly detecting a short circuit makes it possible to detect a short circuit early and to avoid an excessively high short-circuit current. The semiconductor-based protective switching device interrupts the circuit virtually without delay, within μs, in the sense of a shutdown process. No high currents occur and the load on the energy absorber of a semiconductor-based protective switching device is reduced. Known short-circuit detections or shutdown criteria are usually based on the determination and evaluation of the actual current value.

The present invention relates to low-voltage AC circuits having an AC voltage, usually having a time-dependent sinusoidal AC voltage of the frequency f, typically 50 or 60 hertz (Hz). The temporal dependence of the instantaneous voltage value u(t) of the AC voltage is described by the equation:

$$u(t) = U * \sin(2\pi * f * t),$$

where:

$u(t)$ = instantaneous voltage value at the time $t$ $U$ = amplitude (maximum value) of the voltage A harmonic AC voltage can be represented by the rotation of a phasor, the length of which corresponds to the amplitude (U) of the voltage. In this case, the instantaneous deviation is the projection of the phasor onto a coordinate system. An oscillation period corresponds to one full revolution of the phasor and its full angle is 2π (2 pi) or 360°. The angular frequency is the rate of change of the phase angle of this rotating phasor. The angular frequency of a harmonic oscillation is always 2π times its frequency, that is to say:

$$\omega = 2\pi * f = 2\pi / T = \text{angular frequency of the AC voltage}$$

$$(T = \text{period duration of the oscillation})$$

It is often preferred to state the angular frequency (o) rather than the frequency (f) since many formulas in oscillation theory can be represented in a more compact manner with the aid of the angular frequency account of the occur rence of trigonometric functions, the period of which is by definition $2\pi$:

$$u(t) = U * \sin(\omega t)$$

In the case of angular frequencies that are not constant over time, the term "instantaneous angular frequency" is also used.

In the case of a sinusoidal AC voltage, in particular an AC voltage that is constant over time, the time-dependent value formed from the angular velocity $\omega$ and the time t corresponds to the time-dependent angle $\varphi(t)$, which is also referred to as the phase angle $\varphi(t)$. That is to say, the phase angle $\varphi(t)$ periodically runs through the range $0 \ldots 2\pi$ or $0° \ldots 360°$. That is to say, the phase angle periodically assumes a value between 0 and $2\pi$ or 0° and 360° ($\varphi = n*(0 \ldots 2\pi)$ or $\varphi = n*(0° \ldots 360°)$, owing to periodicity; for short: $\varphi = 0 \ldots 2\pi$ or $\varphi = 0° \ldots 360°$).

The instantaneous voltage value u(t) is consequently used to mean the instantaneous value of the voltage at the time t, that is to say, in the case of a sinusoidal (periodic) AC voltage, the value of the voltage for the phase angle $\varphi$ ($\varphi = 0 \ldots 2\pi$ or $\varphi = 0' \ldots 360°$, of the respective period).

SUMMARY OF THE INVENTION

The object of the present invention is to improve a protective switching device of the type mentioned at the outset, in particular to improve the reliability of a protective switching device and the safety in the low-voltage circuit, in particular to avoid unwanted currents caused by faults or aging.

This object is achieved by means of a protective switching device as claimed and by means of a method as claimed.

The invention provides an (electronic) protective switching device for protecting an electrical low-voltage circuit, in particular a low-voltage AC circuit, having:

- a housing having first, in particular grid-side, and second, in particular load-side, connections for conductors of the low-voltage circuit,
- a mechanical isolating contact unit which is connected in series with an electronic interruption unit, wherein, in particular, the mechanical isolating contact unit is assigned to the (second) load-side connections and the electronic interruption unit is assigned to the (first) grid-side connections,

- wherein the mechanical isolating contact unit can be switched by opening contacts in order to avoid a current flow or closing the contacts for a current flow in the low-voltage circuit,
- wherein the electronic interruption unit can be switched, by means of semiconductor-based switching elements, into a high-impedance state of the switching elements in order to avoid a current flow or into a low-impedance state of the switching elements for the current flow in the low-voltage circuit,
- a current sensor unit for determining the level of the current (of at least one conductor, in particular the phase conductor) of the low-voltage circuit in such a manner that instantaneous current values are available,
- a control unit which is connected to the current sensor unit, the mechanical isolating contact unit and the electronic interruption unit, wherein, if the level of the current exceeds at least one current threshold value, avoidance of a current flow in the low-voltage circuit is initiated by switching the electronic interruption unit to high impedance,

- wherein the protective switching device is configured in such a manner that, in the case of a high-impedance electronic interruption unit, or an electronic interruption unit that has been switched to high impedance (that is to say if the electronic interruption unit is intended to be in the high-impedance state), and a current in the low-voltage circuit that exceeds a first fault current threshold value, opening of contacts of the mechanical isolating contact unit is initiated.

According to the invention, the intention is to achieve the situation in which, in the case of a high-impedance electronic interruption unit or an electronic interruption unit that has been switched to high impedance, a current flow in the low-voltage circuit is reliably avoided. If, despite a high-impedance electronic interruption unit or an electronic interruption unit that has been switched to high impedance, currents are determined in the low-voltage circuit, in particular in the phase conductor (in particular in the case of a two-pole protective switching device having a neutral conductor and a phase conductor), which exceed a fault current threshold value, electrical isolation is initiated for the sake of safety by opening the contacts of the mechanical isolating contact unit.

The safety in the low-voltage circuit is therefore increased by means of a reliable protective switching device.

This also has the particular advantage that, in the case of (dangerous) residual currents or a faulty electronic interruption unit, the circuit is released, that is to say increased safety is provided.

Advantageous configurations of the invention are stated in the subclaims.

In one advantageous configuration of the invention, the first connections are grid-side connections and the second connections are load-side connections. The mechanical isolating contact unit is assigned to the load-side connections and the electronic interruption unit is assigned to the grid-side connections.

This has the particular advantage that the protective switching device, in particular the control unit, is supplied with energy. Furthermore, the protective switching device is supplied with energy even when contacts of the mechanical isolating contact unit are open.

In one advantageous configuration of the invention, a communication unit connected to the control unit is provided. A communication unit is used to mean, in particular, wireless or wired or optical communication with another protective switching device, a computer or a superordinate management system. The protective switching device is configured in such a manner that, in the case of a high-impedance electronic interruption unit, or an electronic interruption unit that has been switched to high impedance, and a current in the low-voltage circuit that exceeds the first fault current threshold value, information is signaled using the communication unit.

This has the particular advantage that such a problem is reported and measures can therefore be taken to increase safety again.

In one advantageous configuration of the invention, a display unit which is connected to the control unit is provided, in particular for displaying information on the protective switching device. The protective switching device is configured in such a manner that, in the case of a high-impedance electronic interruption unit, or an electronic interruption unit that has been switched to high impedance, and a current in the low-voltage circuit that exceeds the first fault current threshold value, information is displayed.

This has the particular advantage that the faulty behavior is signaled on the protective switching device.

In one advantageous configuration of the invention, the first fault current threshold value is in the region of 30 mA, 6 mA or 300 mA, more specifically in the range of 26 to 30 mA, in particular in order to advantageously ensure personal protection, specifically in Europe, more specifically in the range of 4 to 6 mA, in particular in order to advantageously ensure personal protection, specifically in North America/USA, more specifically in the range of 290 to 300 mA, in particular in order to advantageously ensure fire protection.

In one advantageous configuration of the invention, when contacts of the mechanical isolating contact unit are closed and the electronic interruption unit comes to have a high impedance, a check for the first fault current threshold value being exceeded is carried out only after a first time limit, in particular after a first time limit of at least 50 μs, more specifically after 100 μs, 150 μs, 200 μs, 250 μs, 300 μs, 350 μs, 400 μs, 450 μs, 500 μs, 550 μs, 600 μs, 650 μs, 700 μs, 750 μs, 800 μs, 850 μs, 900 μs, 950 μs or 1 ms. This has the particular advantage that a check is carried out only after a time limit that is not critical, in particular for personal protection, and the switching behavior of the electronic interruption unit, in particular of energy absorbers or overvoltage protective elements which are present, is therefore also taken into account in order to avoid false tripping and/or unnecessary interruptions by the mechanical isolating contact unit.

In one advantageous configuration of the invention, the first fault current threshold value must be exceeded for a first period in order to cause opening of the contacts, signaling of the information or a display of information.

This has the particular advantage that (uncritical) brief transients, in particular caused by the switching behavior of the electronic interruption unit, in particular energy absorbers or overvoltage protective elements which are present, are not taken into account. False tripping and/or unnecessary interruptions by the mechanical isolating contact unit are therefore avoided in order to avoid restricting the availability of the energy supply and ensuring the supply reliability.

In one advantageous configuration of the invention, the first period is dependent on the level of the determined current.

This has the particular advantage that increased safety is ensured. Tripping is effected quickly in the case of high currents and the behavior can be observed for longer in the case of low currents. Personal safety and also supply reliability are therefore ensured.

In one advantageous configuration of the invention, the first period is at least 50 μs, in particular greater than 100 μs, 150 μs, 200 μs, 250 μs, 300 μs, 350 μs, 400 μs, 450 μs, 500 μs, 550 μs, 600 μs, 650 μs, 700 μs, 750 μs, 800 μs, 850 μs, 900 μs, 950 μs or 1 ms.

Furthermore, the first period may be at most 5 ms. This has the particular advantage that there are specific periods.

In one advantageous configuration of the invention, a voltage sensor unit connected to the control unit is provided for the purpose of determining the level of the voltage across the electronic interruption unit, in particular of a conductor, in particular of the phase conductor. The level of the voltage is compared with a voltage threshold value and a check for the first fault current threshold value being exceeded is suspended for a second period if the voltage threshold value is exceeded.

The second period may be less than 10 ms.

The voltage threshold value is greater than the amplitude of the (nominal) grid voltage of the low-voltage circuit (consequently greater than 325 volts in the case of a 230 volt grid).

In particular, the voltage threshold value is higher than that of an elevated grid voltage. An elevated grid voltage is, for example, a voltage of more than 10% above the (nominal) amplitude of the grid voltage (consequently approximately 360 volts in the case of a 230 volt grid with an amplitude of approximately 325 volts).

In particular, the voltage threshold value is less than the dielectric strength of the semiconductor-based switching elements (power semiconductors) of the electronic interruption unit that are used.

This has the particular advantage that (temporarily) invalid grid states are taken into account; that is to say, if, for example, a surge occurs or lightning strikes the low-voltage circuit or lightning produces temporary overvoltages, these are not taken into account according to the invention.

The robustness of the protective switching device is therefore increased without ignoring safety.

In one advantageous configuration of the invention, a setting element, in particular a single setting element, is provided on the protective switching device and can be used to set a limit value for the current threshold value or current rise in order to set the limit value for the overcurrent or short-circuit detection.

This has the particular advantage that the setting can be carried out by means of a current threshold value or by means of a current rise threshold value or current change threshold value.

In one advantageous configuration of the invention, the protective switching device is configured in such a manner that the control unit has an analog first subunit and a digital second subunit. The first subunit has a current comparator, to which the instantaneous current values or current change values and at least one current threshold value or instantaneous current change threshold values are supplied, in particular from the second subunit. The current threshold values or current change threshold values are provided in terms of phase by the second subunit in accordance with the temporal profile of the voltage. This makes it possible to compare the instantaneous current values or the instantaneous current change values with the at least one current threshold value or the instantaneous current change threshold values in relation to the phase of the temporal profile of the voltage. As a result of this, it is possible to initiate interruption of the low-voltage circuit in the event of said threshold values being exceeded.

This has the particular advantage of a simple implementation of the solution.

In one advantageous configuration of the invention, the protective switching device is configured in such a manner that a grid synchronization unit is provided. This determines at least one phase angle ($\varphi(t)$) of the voltage and, alternatively, the amplitude (U) of the voltage from the supplied instantaneous voltage values. Provision is made of a threshold value unit that is connected to the grid synchronization unit and possibly the setting element such that instantaneous current (change) threshold values are determined using the phase angle (($\varphi(t)$) of the voltage, the amplitude (U) of the voltage and the, in particular set, limit value for the current threshold value or current rise. The instantaneous current (change) values are compared with the instantaneous current (change) threshold values in terms of phase so as to determine the initiation of an interruption.

This has the particular advantage of a further simple implementation of the solution.

In one advantageous configuration of the invention, the mechanical isolating contact system is configured in such a manner that it is possible to achieve electrical isolation with isolator properties according to the standard, that is to say activation (in contrast to shutdown). A standards-compliant protective switching device is therefore present.

The invention claims a corresponding method for a protective switching device for a low-voltage circuit having electronic (semiconductor-based) switching elements with the same and further advantages.

In the method for protecting an electrical low-voltage circuit:

- a mechanical isolating contact unit is connected in series with an electronic interruption unit,
- the mechanical isolating contact unit can be switched by opening contacts in order to avoid a current flow or closing the contacts for a current flow in the low-voltage circuit,
- the electronic interruption unit can be switched, by means of semiconductor-based switching elements, into a high-impedance state of the switching elements in order to avoid a current flow or into a low-impedance state of the switching elements for the current flow in the low-voltage circuit,
- the level of the current in the low-voltage circuit is determined and, if the level of the current exceeds at least one current threshold value (or current change threshold value), avoidance of a current flow in the low-voltage circuit is initiated by switching the electronic interruption unit to high impedance,
- in the case of a high-impedance electronic interruption unit, or an electronic interruption unit that has been switched to high impedance, the level of the current in the low-voltage circuit is still determined (in particular in the phase conductor) and opening of the contacts of the mechanical isolating contact unit is initiated if a first fault current threshold value is exceeded.

In one advantageous configuration, information is signaled if the first fault current threshold value is exceeded.

In one advantageous configuration, if contacts of the mechanical isolating contact unit are closed and the electronic interruption unit comes to have a high impedance, a check for the first fault current threshold value being exceeded is carried out after a first time limit.

In one advantageous configuration, the first fault current threshold value must be exceeded for a first period in order to cause opening of the contacts, signaling of the information or a display of information.

The invention claims a corresponding computer program product. The computer program product comprises instructions which, when the program is executed by a microcontroller (=microprocessor), cause the latter to improve the reliability of such a protective switching device and to achieve higher safety in the electrical low-voltage circuit to be protected by the protective switching device, specifically in that the mechanical isolating contact unit avoids an electrical current flow in certain situations. The microcontroller (=microprocessor) is part of the protective switching device, in particular the control unit.

The invention claims a corresponding computer-readable storage medium on which the computer program product is stored.

The invention claims a corresponding data carrier signal which transmits the computer program product.

All configurations, both in dependent form referring back to the device claim and the method claim, and referring back only to individual features or combinations of features of patent claims, bring about an improvement in a protective switching device for increasing safety.

The described properties, features and advantages of this invention and the way in which these are achieved will become clearer and more clearly comprehensible in connection with the following description of the exemplary embodiments, which are explained in more detail in connection with the drawing.

DETAILED DESCRIPTION OF THE INVENTION

Figure 1:
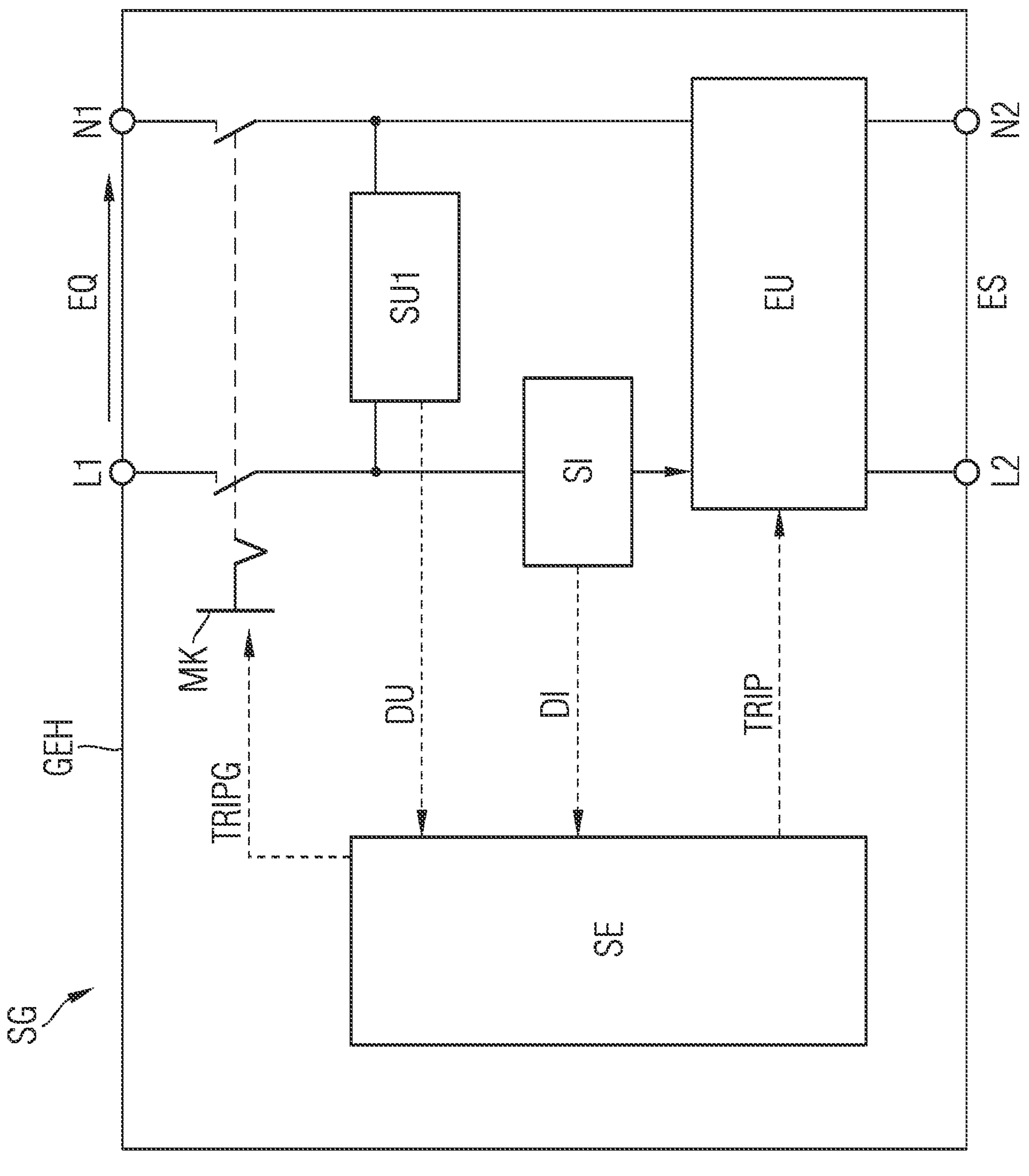
FIG. 1 shows a first illustration of a protective switching device.

FIG. 1 shows an illustration of a protective switching device SG for protecting an electrical low-voltage circuit, having a housing GEH, having:

- connections for conductors of the low-voltage circuit, in particular first connections L1, N1 for a grid-side, in particular energy source-side, connection EQ of the protective switching device SG and second connections L2, N2 for a load-side, in particular energy sink-side—in the case of passive loads, connection ES (consumer-side connection) of the protective switching device SG, wherein phase conductor-side connections L1, L2 and neutral conductor-side connections N1, N2 may be specifically provided;
- the load-side connection may have a passive load (consumer) or/and an active load ((further) energy source), or a load which may be both passive and active, for example in a time sequence;
  - an (optional) first voltage sensor or first voltage sensor unit SU for determining the level of the voltage in the low-voltage circuit such that instantaneous voltage values (phase-related voltage values) DU are available,
  - a current sensor or current sensor unit SI for determining the level of the current in the low-voltage circuit such that instantaneous (phase angle-related) current values DI are available,
  - an electronic interruption unit EU that, by virtue of semiconductor-based switching elements, has or can be switched to have a high-impedance state of the switching elements in order to interrupt the current flow and a low-impedance state of the switching elements for the current flow in the low-voltage circuit,
  - a mechanical isolating contact unit MK that can be switched by opening contacts in order to avoid a current flow or closing the contacts for a current flow in the low-voltage circuit,
  - a control unit SE that is connected to the (optional) first voltage sensor unit SU1, the current sensor unit SI, and the electronic interruption unit EU;

the control unit SE may:

- be implemented with a digital circuit, for example with a microprocessor (=microcontroller); the microprocessor may also contain an analog part;
- be implemented with a digital circuit having analog circuit parts.

The protective switching device SG, in particular the control unit SE, is configured in such a manner that, if the level of the current exceeds at least one current threshold value, avoidance of a current flow in the low-voltage circuit is initiated by switching the electronic interruption unit EU to high impedance,

- that, in the case of a high-impedance electronic interruption unit EU, or an electronic interruption unit that has been switched to high impedance, and a current in the low-voltage circuit that exceeds a first fault current threshold value, opening of contacts of the mechanical isolating contact unit MK is initiated.

If a short circuit, in particular a load-side short circuit (ES), is detected, the electronic interruption unit EU changes from the low-impedance state into the high-impedance state in order to interrupt the low-voltage circuit, this process having a tripping time from the short-circuit event to the high-impedance state. This can be effected by concurrently adapting the current threshold values. In this case, there may be (periodic) instantaneous current (change) threshold values that are dependent on the (periodic) temporal profile of the level of the voltage or the determined instantaneous voltage values.

The instantaneous current (change) threshold values may be present continuously or phase angle-wise.

The instantaneous current (change) threshold values may in this case be present for each individual phase angle, a phase angle range (multiple phase angles), for example every 2°, or a phase angle section (part of a phase angle), for example every 0.5° or 0.1°. In particular, a resolution of 1° to 5° is particularly advantageous (this corresponds to a sampling rate of 3.5 to 20 kHz).

The instantaneous current (change) values are compared with the instantaneous current (change) threshold values in terms of phase. In the event of the instantaneous current (change) threshold value being exceeded in terms of absolute value, interruption of the low-voltage circuit is initiated, for example by means of a first interruption signal TRIP from the control unit SE to the electronic interruption unit EU, as illustrated in FIG. 1.

The electronic interruption unit EU is illustrated as a block in both conductors according to FIG. 1. In a first variant, this is used to mean no interruption of the two conductors. At least one conductor, in particular the active conductor or phase conductor, has semiconductor-based switching elements. The neutral conductor may be free from switching elements, that is to say without semiconductor-based switching elements. That is to say, the neutral conductor is connected directly, that is to say does not come to have a high impedance. That is to say, only a single-pole interruption (of the phase conductor) takes place. If further active conductors/phase conductors are provided, in a second variant of the electronic interruption unit EU, the phase conductors have semiconductor-based switching elements. The neutral conductor is connected directly, that is to say does not come to have a high impedance. This is the case for example for a three-phase AC circuit.

In a third variant of the electronic interruption unit EU, the neutral conductor may likewise have a semiconductor-based switching element, that is to say, in the event of an interruption by the electronic interruption unit EU, both conductors come to have a high impedance.

The electronic interruption unit EU may have semiconductor components such as bipolar transistors, field-effect transistors (FETs), insulated-gate bipolar transistors (IGBTs), metal oxide semiconductor field-effect transistors (MOSFETs) or other (self-commutated) power semiconductors. IGBTs and MOSFETs are particularly suitable for the protective switching device according to the invention due to low forward resistances, high junction resistances and a good switching behavior.

The protective switching device SG has a mechanical isolating contact unit MK (=mechanical isolating contact system MK), in particular according to standards with standards-compliant isolator properties, in order to electrically isolate the circuit, in particular in order to activate (in contrast to shutting down) the circuit in a standards-compliant manner. The mechanical isolating contact unit MK may be connected to the control unit SE, as illustrated in FIG. 1, such that the control unit SE is able to initiate electrical isolation of the circuit.

Specifically, it is possible to implement a further evaluation that brings about electrical isolation when other criteria are met. By way of example, provision may be made for overcurrent detection, for example in the control unit SE, such that, in the event of overcurrents, that is to say in the event of current time limit values being exceeded, that is to say when a current that exceeds a current limit value is present for a particular time, that is to say for example exceeds a particular energy threshold value, semiconductor-based or/and electrical interruption of the circuit takes place.

Alternatively or additionally, electrical isolation may also be initiated for example if a short circuit is detected.

The electrical interruption of the low-voltage circuit is initiated for example by means of a further, second interruption signal TRIPG that is transmitted from the control unit SE to the mechanical isolating contact system MK, as illustrated in FIG. 1.

According to the invention, in the case of a high-impedance electronic interruption unit EU, or an electronic interruption unit EU that has been switched to high impedance, that is to say if the electronic interruption unit EU is intended to be in a high-impedance state, and a current in the low-voltage circuit that is determined, in particular, by the current sensor SI and exceeds a first fault current threshold value, electrical isolation will be initiated. Depending on the field of use of the protective switching device, the first current threshold value may be of the order of magnitude of 4 to 6 mA, in particular 5 mA or 6 mA. The first current threshold value may be in the range of 25 mA to 32 mA, in particular 28 mA, 29 mA or 30 mA, in particular for personal protection in Europe. The third threshold value may be in the range of 290 mA to 300 mA, in particular for fire protection. Each of the boundary and intermediate values mentioned is disclosed.

For this situation, the current is determined, according to the invention, using the current sensor unit SI. There is no need to use a further sensor, such as a summation current transformer, as is provided for fault current circuit breakers. An (additional) summation current transformer may nevertheless be provided in the protective switching device.

The invention is intended to be used to detect and suppress faulty currents in the case of an interruption unit that is defective or does not completely have a high impedance. This is carried out, according to the invention, using a current sensor unit in a conductor (phase conductor).

In a further advantageous configuration, if a current level that exceeds a second current threshold value is determined, interruption of the low-voltage circuit can be initiated, in particular by means of the mechanical isolating contact system.

The second current threshold value corresponds, for example, to the standards-compliant current (time) limit values, that is to say the I(t) characteristic curves for protective devices, for example according to the IEC 60947 or IEC 60898 standard. The chosen current (time) limit values are chosen by a person skilled in the art according to the present use/application.

In a further advantageous configuration, if interruption of the low-voltage circuit is initiated by means of the electronic interruption unit and in the case of a current flow in the low-voltage circuit that exceeds a third current threshold value and persists for a second period, interruption of the low-voltage circuit can be initiated by means of the mechanical isolating contact system in order to bring about, for example, interruption by means of the mechanical isolating contact system in the case of a failed high-impedance state of the electronic interruption unit and therefore failed interruption of the low-voltage circuit. Operational reliability is thus advantageously increased. Such a process may advantageously be displayed on the protective switching device.

The third current threshold value and the second period correspond, for example, to the standards-compliant current-time limit values, that is to say the I-t characteristic curves for protective devices, for example according to the IEC 60947 or IEC 60898 standard. The chosen current-time limit values are chosen by a person skilled in the art according to the present use/application.

The mechanical isolating contact system MK may perform single-pole interruption in a first variant. That is to say, only one conductor of the two conductors, in particular the active conductor or phase conductor, is interrupted, that is to say has a mechanical contact. The neutral conductor is then free from contacts, that is to say the neutral conductor is connected directly.

If further active conductors/phase conductors are provided, in a second variant, the phase conductors have mechanical contacts of the mechanical isolating contact system. In this second variant, the neutral conductor is connected directly. This is the case for example for a three-phase AC circuit.

In a third variant of the mechanical isolating contact system MK, the neutral conductor likewise has mechanical contacts, as illustrated in FIG. 1.

A mechanical isolating contact system MK is used to mean in particular a (standards-compliant) isolating function, performed by the isolating contact system MK. Isolating function is used to mean the following points:

- minimum clearance in air according to standards (minimum distance between the contacts),
- contact position indication for the contacts of the mechanical isolating contact system,
- actuation of the mechanical isolating contact system is always possible (no blocking of the isolating contact system).

With regard to the minimum clearance in air between the contacts of the isolating contact system, this is essentially voltage-dependent. Other parameters are the pollution degree, the type of field (homogeneous, inhomogeneous) and the air pressure or height above sea level.

There are corresponding rules or standards for these minimum clearances in air or creepage paths. These rules stipulate for example, in the case of air for a impulse withstand voltage, the minimum clearance in air for an inhomogeneous and a homogeneous (ideal) electric field on the basis of the pollution degree. The impulse withstand voltage is the withstand capability when a corresponding impulse voltage is applied. The isolating contact system or protective switching device has an isolating function (isolator property) only when this minimum length (minimum distance) is present.

In terms of the invention, the DIN EN 60947 and IEC 60947 series of standards is relevant to the isolator function and the properties thereof in this case, to which standards reference is made here.

The isolating contact system is advantageously characterized by a minimum clearance in air between the open isolating contacts in the OFF position (open position, open contacts) on the basis of the rated impulse withstand voltage and the pollution degree. The minimum clearance in air is in particular between (at least) 0.01 mm and 14 mm. The minimum clearance in air is in particular advantageously between 0.01 mm at 0.33 kV and 14 mm at 12 kV, in particular for pollution degree 1 and in particular for inhomogeneous fields.

Advantageously, the minimum clearance in air may have the following values:

E DIN 60947-1 (VDE 0660-100):2018-06

TABLE 13

Minimum clearances in air

| Rated impulse withstand voltage $U_{imp}$ | Minimum clearances mm | | | | | | | |
|---|---|---|---|---|---|---|---|---|
| | Case A Inhomogeneous field conditions (see 3.7.63) Pollution degree | | | | Case B Homogeneous field ideal conditions (see 3.7.62) Pollution degree | | | |
| kV | 1 | 2 | 3 | 4 | 1 | 2 | 3 | 4 |
| 0.33 | 0.01 | 0.2 | 0.8 | 1.6 | 0.01 | 0.2 | 0.8 | 1.6 |
| 0.5 | 0.04 | | | | 0.04 | | | |
| 0.8 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |

TABLE 13-continued

Minimum clearances in air

| Rated impulse withstand voltage $U_{imp}$ | Minimum clearances mm | | | | | | | |
|---|---|---|---|---|---|---|---|---|
| | Case A Inhomogeneous field conditions (see 3.7.63) Pollution degree | | | | Case B Homogeneous field ideal conditions (see 3.7.62) Pollution degree | | | |
| kV | 1 | 2 | 3 | 4 | 1 | 2 | 3 | 4 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The values of minimum clearances in air are based on 1.2/50 μs impulse voltage, for barometric pressure of 80 kPa, equivalent to normal atmospheric pressure at 2 000 m above sea level.

The pollution degrees and field types correspond to those defined in the standards. This advantageously makes it possible to achieve a standards-compliant protective switching device dimensioned in accordance with the rated impulse withstand voltage.

Figure 2:
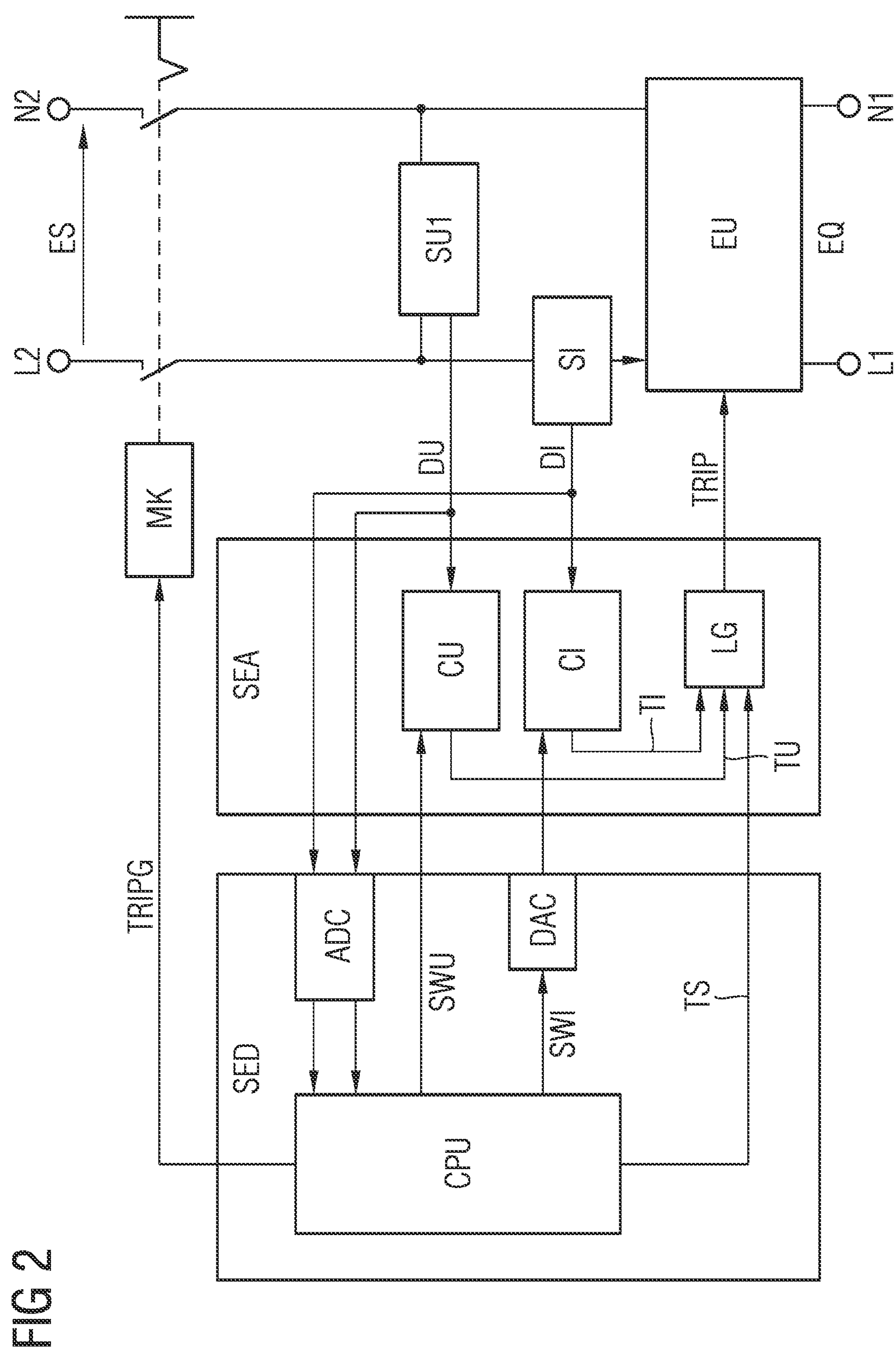
FIG. 2 shows a second illustration of a protective switching device.

FIG. 2 shows an illustration according to FIG. 1, with a further detailed configuration and differences. In the example according to FIG. 2, the mechanical isolating contact unit MK is assigned to the second, load-side connections L2, N2 or the load side/consumer side ES. The electronic interruption unit EU is assigned to the first connections L1, N1 of the grid-side, in particular energy source-side, connection EQ. That is to say, the series circuit of a mechanical isolating contact unit MK and an electronic interruption unit EU, which series circuit connects the first and second connections, is swapped in comparison with FIG. 1. According to FIG. 2, the mechanical isolating contact unit MK is assigned to the load-side connections and the electronic interruption unit EU is assigned to the grid-side connections. The protective switching device can be advantageously supplied with energy from the grid-side connections. The protective switching device is therefore normally supplied with energy.

According to FIG. 2, the control unit SE has two subunits, a first, preferably analog, subunit SEA and a second, preferably digital, subunit SED. In this case, the first subunit SEA has a (current) comparator CI. On the one hand, the instantaneous current (change) values DI from the current sensor SI are supplied to this comparator. On the other hand, the instantaneous current (change) threshold values SWI are supplied to the current comparator CI by the second subunit SED.

The current comparator CI compares the instantaneous current (change) values DI with the instantaneous current (change) threshold values SWI and outputs, as described, a first current interruption signal TI for initiating interruption of the low-voltage circuit if said threshold values are exceeded.

The current interruption signal TI may be supplied to a logic unit LG which combines it with other interruption signals and outputs the first interruption signal TRIP for semiconductor-based interruption or high-impedance interruption to the electronic interruption unit EU.

In one configuration, the current comparator CI buffers the instantaneous threshold values SWI in order to constantly have the values available.

The instantaneous current (change) threshold values SWI are synchronized with the temporal profile of the instantaneous voltage values (the temporal profile of the voltage). As a result, in the case of a small instantaneous voltage (phase angle of a sinusoidal AC voltage of for example −30° to 0° to 30°), small instantaneous current (change) threshold values SWI are used (or are present) and, in the case of a high instantaneous voltage (phase angle of a sinusoidal AC voltage of for example 60° to 90° to 120°), high current (change) threshold values SWI are used (or are present), with the result that the trip time is largely independent of the phase angle of the voltage, and so the trip time is below the temporal first threshold value.

The instantaneous current (change) values/current values DI are additionally supplied to the second subunit SED. In one preferred configuration, the instantaneous current values DI are digitized there by an analog-to-digital converter ADC and supplied to a microprocessor CPU. This determined or calculated the instantaneous current (change) threshold values SWI. The instantaneous current (change) threshold values SWI determined by the second subunit SED or in particular the microprocessor CPU are in turn supplied to the first subunit SEA, in particular to the current comparator CI, in order to perform the comparison described above.

In this case, the instantaneous current (change) threshold values SWI may advantageously be determined digitally in the second subunit SED or with a slower processing speed than the continuous comparison of instantaneous current (change) values DI with the instantaneous current (change) threshold values SWI in the first subunit SEA.

In one advantageous configuration of the invention, the first subunit SEA may have a voltage comparator CU. On the one hand, the instantaneous voltage values DU from the voltage sensor SU are supplied to said comparator. On the other hand, instantaneous voltage threshold values SWU are supplied to the voltage comparator CU by the second subunit SED.

The voltage comparator CU compares the instantaneous voltage values DU with the instantaneous voltage threshold values SWU and outputs a voltage interruption signal TU for initiating interruption of the low-voltage circuit if said threshold values are exceeded or undershot or during range checking.

The voltage interruption signal TU may be supplied to the logic unit LG which combines it with the (other) interruption signal(s) and outputs the first interruption signal TRIP for semiconductor-based interruption or high-impedance interruption to the electronic interruption unit EU.

In one configuration, the voltage comparator CU buffers the instantaneous threshold values SWU in order to constantly have the values available.

In this configuration, the instantaneous voltage values DU may also be supplied to the second subunit SED. In a further preferred configuration, the instantaneous voltage values DU are digitized there by the analog-to-digital converter ADC and are supplied to the microprocessor CPU. The latter determines or calculates the instantaneous voltage threshold values SWU. The instantaneous voltage threshold values SWU determined by the second subunit SED or, in particular, by the microprocessor CPU are in turn supplied to the first subunit SEA, in particular to the voltage comparator CU, in order to carry out the comparison described above.

In this case, the instantaneous voltage threshold values SWU may advantageously be determined digitally in the second subunit SED or with a slower processing speed than the continuous comparison of instantaneous voltage values DU and instantaneous voltage threshold values SWU in the first subunit SEA.

Depending on the configuration, a second interruption signal TRIPG may be output by the second subunit SED of the control unit SE, in particular by the microprocessor CPU, to the mechanical isolating contact system MK so as to electrically interrupt the low-voltage circuit, as illustrated in FIG. 2.

The configuration of the control unit with an analog first subunit and a digital second subunit has the particular advantage that an efficient architecture is present. The first analog subunit can perform a very fast comparison of instantaneous values and threshold values, thereby enabling fast short-circuit detection. The second subunit may perform a threshold value calculation or adaptation that is independent thereof and does not have to be performed as quickly as the detection. The threshold values may for example be buffered in order to be available for a fast comparison. The threshold values do not have to be adapted constantly.

Higher evaluation reliability can also be achieved by combining current values or current change values and voltage values.

According to the invention, the protective switching device is configured in such a manner that, in the case of an electronic interruption unit EU that has been switched to high impedance, the current continues to be monitored. This can be carried out by adapting the current threshold values SWI. That is to say, the current threshold value SWI is then set to the first fault current threshold value. That is to say, the current value DI is then compared with the (lower) current threshold value SWI (first fault current threshold value, for example 30 mA). Alternatively, the current values may also be evaluated by the digital second subunit SED for this situation.

If the first fault current threshold value is exceeded, opening of contacts of the mechanical isolating contact unit MK is initiated (via a further connection of the first subunit SEA or its (current) comparator CI [not illustrated] or by the second subunit SED).

Figure 3:
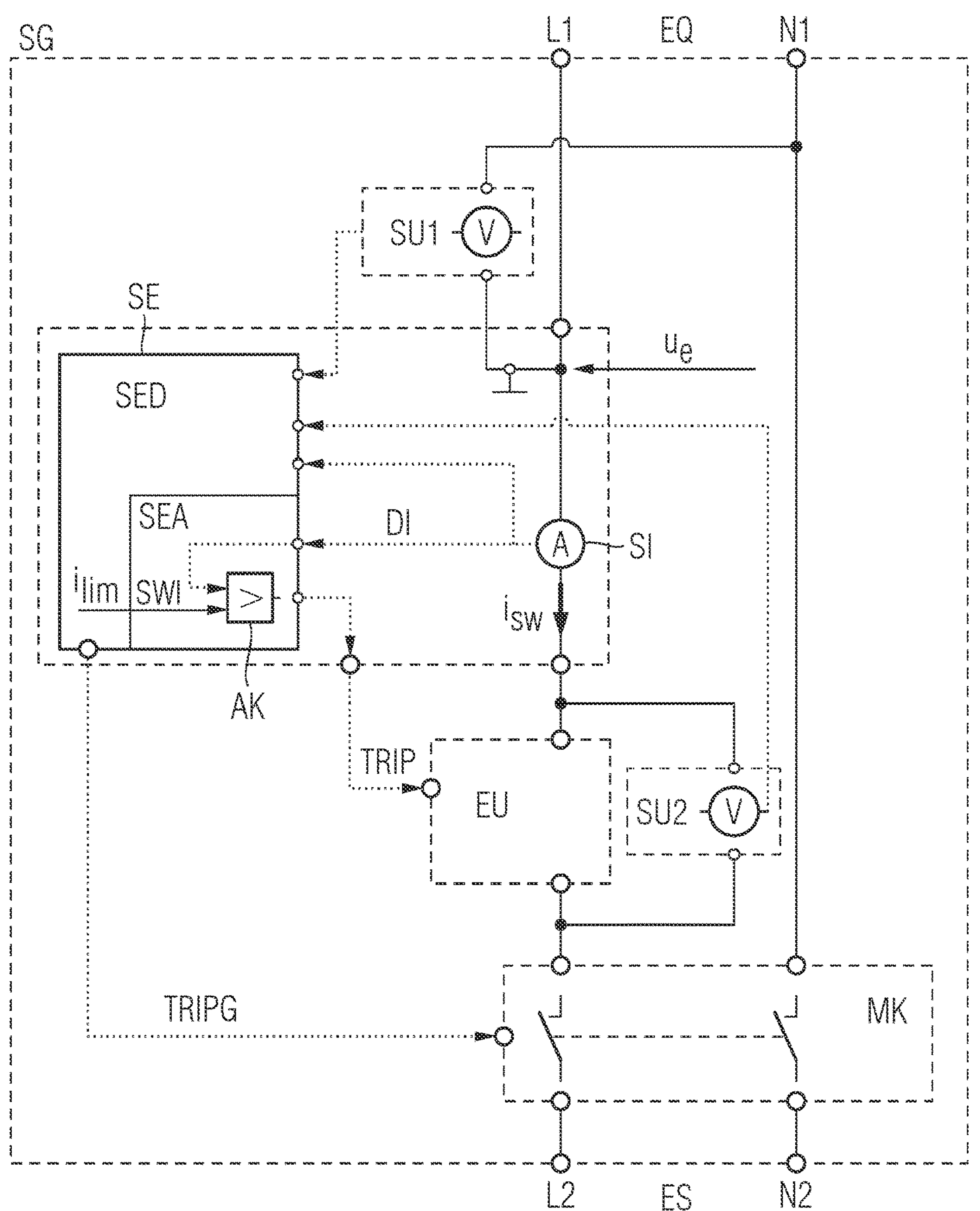
FIG. 3 shows a third illustration of a protective switching device.

FIG. 3 shows an illustration according to FIGS. 1 and 2. The series circuit of a mechanical isolating contact unit MK and an electronic interruption unit EU, which series circuit electrically connects the first and second connections, is provided according to FIG. 2 such that the first connections L1, N1 are grid-side connections and the second connections L2, N2 are load-side connections, wherein the mechanical isolating contact unit MK is assigned to the load-side connections and the electronic interruption unit EU is assigned to the grid-side connections. The control unit SE is indicated with the first subunit SEA and the second subunit SED.

FIG. 3 shows the difference that a second voltage sensor unit SU2 connected to the control unit is provided for the purpose of determining the level of the voltage across the electronic interruption unit. The second voltage sensor unit SU2 determines the level of the voltage across the electronic interruption unit of a conductor of the electronic interruption unit. In the example, (preferably) in the phase conductor.

The level of the voltage is compared with a voltage threshold value and a check for the first fault current threshold value being exceeded is suspended for a second period if the voltage threshold value is exceeded.

The second period is less than 10 ms.

The voltage threshold value is greater than the amplitude of the grid voltage of the low-voltage circuit, in particular higher than that of an elevated (for example +10%) grid voltage; in particular, an elevated grid voltage is a voltage of more than 10% above the amplitude of the grid voltage, based on the amplitude of the grid voltage.

The voltage threshold value should be selected to be less than the dielectric strength of the semiconductor-based switching elements of the electronic interruption unit EU that are used. A communication unit which is not illustrated in the figures and is connected to the control unit SE, for example a communication module with a WLAN option, may be provided on the protective switching device. The protective switching device is configured in such a manner that, in the case of a high-impedance electronic interruption unit EU, or an electronic interruption unit that has been switched to high impedance, and a current in the low-voltage circuit that exceeds the first fault current threshold value, information is signaled by means of the communication unit.

A display unit which is not illustrated in the figures, is connected to the control unit SE and has an information display, for example an LED, a segment display, a display etc., may be provided on the protective switching device. The protective switching device is configured in such a manner that, in the case of a high-impedance electronic interruption unit EU, or an electronic interruption unit that has been switched to high impedance, and a current in the low-voltage circuit that exceeds the first fault current threshold value, information is displayed.

According to the invention, when contacts of the mechanical isolating contact unit MK are closed and the electronic interruption unit EU comes to have a high impedance, a check for the first fault current threshold value being exceeded may be carried out after a first time limit, that is to say may be suspended in terms of time, in particular after a first time limit of at least 50 μs, more specifically after 100 μs, 150 μs, 200 μs, 250 μs, 300 μs, 350 μs, 400 μs, 450 μs, 500 μs, 550 μs, 600 μs, 650 μs, 700 μs, 750 μs, 800 μs, 850 μs, 900 μs, 950 μs or 1 ms.

According to the invention, the first fault current threshold value may be exceeded only for a first period in order to cause opening of the contacts, signaling of the information or a display of information. The first period may be dependent on the level of the determined current. The first period may be at least 50 μs, in particular greater than 100 μs, 150 μs, 200 μs, 250 μs, 300 μs, 350 μs, 400 μs, 450 μs, 500 μs, 550 μs, 600 μs, 650 μs, 700 μs, 750 μs, 800 μs, 850 μs, 900 μs, 950 μs or 1 ms. The first period may be at most 5 ms.

The monitoring may also be controlled at least partially by means of software or firmware, that is to say a computer program product, for the control unit or the second subunit or its microcontroller (=microprocessor).

Figure 4:
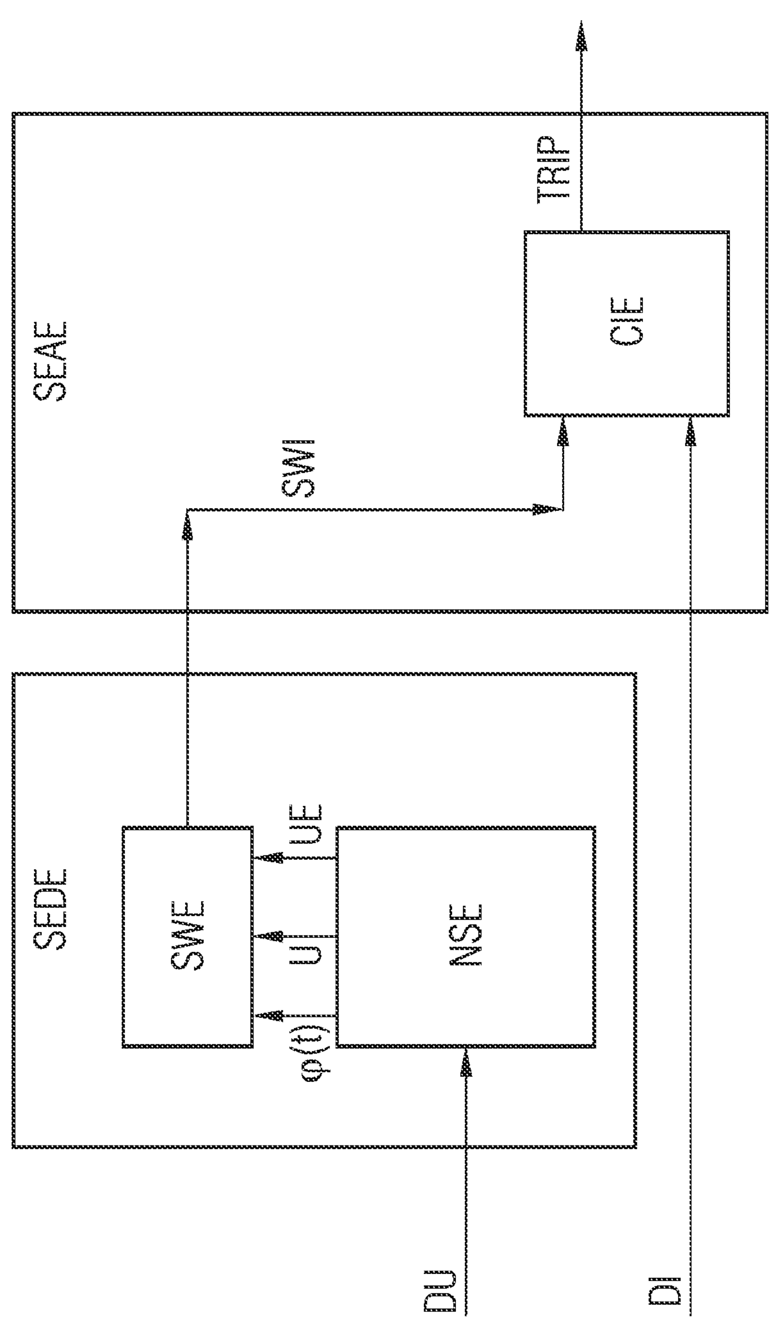
FIG. 4 shows a first configuration of the protective switching device.

FIG. 4 shows a further configuration or variant according to FIGS. 1, 2 and 3. FIG. 4 shows part of a simple variant of the first, preferably analog, subunit SEAE and part of an alternative variant of the second, preferably digital, subunit SEDE.

The part of the simple variant of the first subunit SEAE has the current comparator CIE, to which the instantaneous current values DI, in particular their absolute value, and the instantaneous current threshold values SWI, in particular likewise based on their absolute value, are supplied. In this example, the current comparator CIE directly outputs the first interruption signal TRIP for interrupting the low-voltage circuit, in a similar manner to the previous figures. The absolute values can be formed by one or more units that are not illustrated.

The part of the alternative variant of the second subunit SEDE has a grid synchronization unit NSE. The (analog) instantaneous voltage values DU are supplied to said grid synchronization unit. The grid synchronization unit NSE uses the supplied (analog) instantaneous voltage values DU, which are for example a sinusoidal AC voltage of the low-voltage circuit, to determine the phase angle $\varphi(t)$ of the voltage.

Alternatively, the amplitude U and an expected time value of the voltage UE or expected value of the voltage UE can additionally also be determined.

In this case, the expected value of the voltage UE is a type of filtered or regenerated or generated equivalent instantaneous voltage value DU.

The phase angle $\varphi(t)$ (and also the expected value of the voltage UE or the amplitude U) of the voltage DU may for example be determined by a so-called phase-locked loop or PLL for short. A PLL is an electronic circuit arrangement that influences the phase relation and thus accordingly the frequency of a changeable oscillator via a closed control loop such that the phase difference between an external periodic reference signal (instantaneous voltage values) and the oscillator or a signal derived therefrom is as constant as possible. A phase-locked loop can also be programmed as software for a microcontroller (as part of the computer program product).

This makes it possible to determine inter alia the phase angle $\varphi(t)$, the fundamental frequency and the amplitude thereof of the supplied grid voltage, that is to say the ascertained voltage values, that is say for example also the (untouched or filtered) expected value of the (grid) voltage.

The phase angle $\varphi(t)$ determined by the grid synchronization unit NSE (and possibly the amplitude U or/and the expected time value of the voltage UE) are supplied to a threshold value unit SWE. The threshold value unit SWE may have a (scaled) curve for the (phase-related) instantaneous current threshold values SWI. By way of example, in the case of a sinusoidal AC voltage of the low-voltage circuit, an (approximately) sinusoidal current threshold value curve, that is to say a profile that is sinusoidal in terms of height of the instantaneous current threshold values SWI over the phase angles 0° to 360° or the period duration (or the (corresponding) time).

The protective switching device SG may have a setting element, in particular a single setting element. This in particular single setting element on the protective switching device SG makes it possible to set a limit value for the current threshold value or the current rise. Alternatively, the limit value for the current threshold value may also be fixedly prescribed or programmed.

According to the invention, the current threshold value curve is then scaled with regard to this limit value for the current threshold value as set or fixedly prescribed by way of the setting element. By way of example, the amplitude (that is to say the maximum value) of the current threshold value curve may be scaled with the limit value/maximum value for the current threshold value.

The instantaneous current threshold values SWI, owing to the presence of the phase angle $\varphi(t)$ of the voltage in the threshold value unit SWE, may be transmitted by the latter, in sync with the instantaneous current value DI, to the current comparator CIE, such that a phase-related (phase angle-related) comparison between the instantaneous current value DI and the instantaneous current threshold value SWI may take place.

The current threshold values may also be stored (in scaled form) in a table, in which case the value is then adapted if necessary.

For normal operation and for avoiding a current flow in the low-voltage circuit by checking whether the level of the current exceeds at least one current threshold value, the control unit according to the invention, in particular with the two subunits, can be used to switch the electronic interruption unit to high impedance. The current threshold value may be fixed or adapted according to the invention (instantaneous current threshold values).

In order to detect a current in the case of a high-impedance electronic interruption unit EU or an electronic interruption unit that has been switched to high impedance, only a (fixed) first fault current threshold value is required. Only one part of the control unit according to the invention is required here. The detection can also be carried out in a different manner.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A protective switching device for protecting an electrical low-voltage circuit, the protective switching device comprising:

- a housing having first and second connections for conductors of the low-voltage circuit;
- a series circuit of a mechanical isolating contact unit and an electronic interruption unit, said series circuit electrically connecting said first and second connections;
- said mechanical isolating contact unit being configured for switching by opening contacts in order to avoid a current flow or closing the contacts for a current flow in the low-voltage circuit;
- said electronic interruption unit being configured for switching, by way of semiconductor-based switching elements, into a high-impedance state of said switching elements in order to avoid a current flow or into a low-impedance state of said switching elements for the current flow in the low-voltage circuit;
- a current sensor unit for determining a level of the current of the low-voltage circuit and for providing instantaneous current values;
- a control unit connected to said current sensor unit, to said mechanical isolating contact unit and to said electronic interruption unit, wherein, when the level of the current exceeds at least one current threshold value, said control unit initiates an avoidance of a current flow in the low-voltage circuit by switching said electronic interruption unit to high impedance; and
- wherein, when said electronic interruption unit is in a high impedance state and only if a current in the low-voltage circuit exceeds a first fault current threshold value, an opening of contacts of said mechanical isolating contact unit is initiated.

2. The protective switching device according to claim 1, wherein:

said first connections are grid-side connections and said second connections are load-side connections; and said mechanical isolating contact unit is assigned to said load-side connections and said electronic interruption unit is assigned to said grid-side connections.

3. The protective switching device according to claim 1, which further comprises a communication unit connected to said control unit and wherein, when said electronic interruption unit is in the high-impedance state and the current in the low-voltage circuit exceeds the first fault current threshold value, information is signaled via said communication unit.

4. The protective switching device according to claim 1, which further comprises a display unit connected to said control unit and an information display on the protective switching device, and wherein, when a high-impedance electronic interruption unit is in the high impedance state and a current in the low-voltage circuit exceeds the first fault current threshold value, information is displayed.

5. The protective switching device according to claim 1, wherein the first fault current threshold value lies in a range selected from the group consisting of a range from 26 to 30 mA, a range from 4 to 6 mA, and a range from 290 to 300 mA.

6. The protective switching device according to claim 1, wherein, when contacts of said mechanical isolating contact unit are closed and said electronic interruption unit enters the high impedance state, the protective switching device is configured to check within a first time limit whether or not the first fault current threshold value is being exceeded.

7. The protective switching device according to claim 6, wherein the first time limit is selected from the group consisting of at least 50 μs, 100 μs, 150 μs, 200 μs, 250 μs, 300 s, 350 μs, 400 μs, 450 μs, 500 μs, 550 μs, 600 μs, 650 μs, 700 μs, 750 μs, 800 μs, 850 μs, 900 μs, 950 μs, and 1 ms.

8. The protective switching device according to claim 1, wherein the first fault current threshold value must be exceeded for a first period of time in order to cause an opening of the contacts, a signaling of the information, or a display of information.

9. The protective switching device according to claim 8, wherein the first period of time is dependent on the level of the determined current.

10. The protective switching device according to claim 8, wherein in that the first period of time is at least 50 μs.

11. The protective switching device according to claim 10, wherein the first period of time is selected from a time period that is greater than 100 μs, 150 μs, 200 μs, 250 μs, 300 μs, 350 μs, 400 μs, 450 μs, 500 μs, 550 μs, 600 μs, 650 μs, 700 μs, 750 μs, 800 μs, 850 μs, 900 μs, 950 μs, and 1 ms.

12. The protective switching device according to claim 8, wherein the first period of time is at most 5 ms.

13. The protective switching device according to claim 8, which further comprises a voltage sensor unit connected to said control unit for determining a level of a voltage across said electronic interruption unit of a conductor, and wherein a level of the voltage is compared with a voltage threshold value and a check for an exceedance of the first fault current threshold value is suspended for a second period of time when the voltage threshold value is exceeded.

14. The protective switching device according to claim 13, wherein the second period of time is less than 10 ms.

15. The protective switching device according to claim 13, wherein the voltage threshold value is greater than an amplitude of a grid voltage of the low-voltage circuit.

16. The protective switching device according to claim 15, wherein an elevated grid voltage is a voltage of more than 10% above the amplitude of the grid voltage, based on the amplitude of the grid voltage, and the voltage threshold value is higher than that of an elevated grid voltage.

17. The protective switching device according to claim 13, wherein the voltage threshold value is less than a dielectric strength of said semiconductor-based switching elements of said electronic interruption unit.

18. A method for protecting an electrical low-voltage circuit for a protective switching device, the method comprising:

providing a mechanical isolating contact unit connected in series with an electronic interruption unit;

wherein the mechanical isolating contact unit is switchable by opening contacts in order to avoid a current flow or closing the contacts for a current flow in the low-voltage circuit; and wherein the electronic interruption unit is switchable, by semiconductor-based switching elements, into a high-impedance state of the switching elements in order to avoid a current flow or into a low-impedance state of the switching elements for the current flow in the low-voltage circuit;

determining a level of the current in the low-voltage circuit and, when the level of the current exceeds at least one current threshold value, initiating an avoidance of a current flow in the low-voltage circuit by switching the electronic interruption unit to high impedance; and with a high-impedance electronic interruption unit, or a switching of an electronic interruption unit into a high impedance state, still determining the level of the current in the low-voltage circuit and initiating an opening of the contacts of the mechanical isolating contact unit only if a first fault current threshold value is exceeded.

19. The method according to claim 18, which comprises signaling information when the first fault current threshold value is exceeded.

20. The method according to claim 18, which comprises, if contacts of the mechanical isolating contact unit are closed and the electronic interruption unit comes to have a high impedance, carrying out a check whether the first fault current threshold value is being exceeded after a first time limit.

21. The method according to claim 18, which comprises causing the opening of the contacts, signaling of the information, or displaying the information only after the first fault current threshold value has been exceeded for a first period of time.

22. A computer program product, comprising non-transitory instructions which, when the instructions are executed by a microcontroller, program the controller to carry out the method according to claim 18 on a protective switching device.

23. A computer-readable storage medium on which the non-transitory computer program product according to claim 22 is stored.

24. A protective switching device for protecting an electrical low-voltage circuit, the protective switching device comprising:

a housing having first and second connections for conductors of the low-voltage circuit;

a series circuit of a mechanical isolating contact unit and an electronic interruption unit, said series circuit electrically connecting said first and second connections;

said mechanical isolating contact unit being configured for switching by opening contacts in order to avoid a current flow or closing the contacts for a current flow in the low-voltage circuit;

said electronic interruption unit being configured for switching, by way of semiconductor-based switching elements, into a high-impedance state of said switching elements in order to avoid a current flow or into a low-impedance state of said switching elements for the current flow in the low-voltage circuit;

a current sensor unit for determining a level of the current of the low-voltage circuit and for providing instantaneous current values;

a control unit connected to said current sensor unit, to said mechanical isolating contact unit and to said electronic interruption unit, wherein, when the level of the current exceeds at least one current threshold value, said control unit initiates an avoidance of a current flow in the low-voltage circuit by switching said electronic interruption unit to high impedance; and wherein, when said electronic interruption unit is in a high impedance state and only if a current in the low-voltage circuit exceeds a first fault current threshold value, an opening of contacts of said mechanical isolating contact unit is initiated, and said first fault current threshold value is lower than the current threshold value.

* * * * *